INVENTORS
Melvin Lipschultz
George A. Cernak
Morris H. Joffe
By: Hallenstein & Spangenberg attys

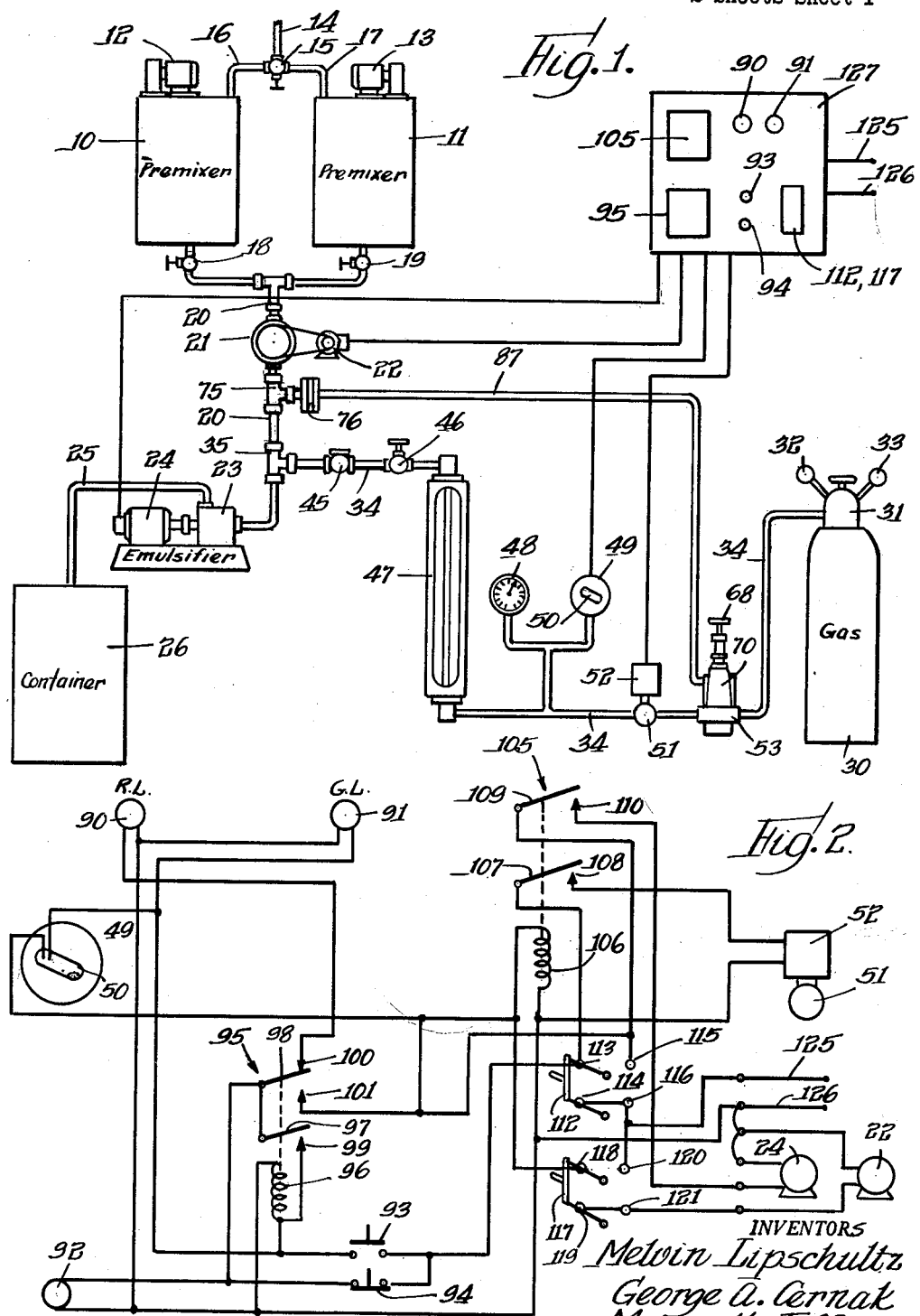

United States Patent Office 3,120,377
Patented Feb. 4, 1964

3,120,377
APPARATUS FOR PRODUCING DRESSING
Melvin Lipschultz, Evanston, George A. Cernak, Lockport, and Morris H. Joffe, Chicago, Ill., assignors to The Emulsol Egg Products Corporation, Chicago, Ill., a corporation of Illinois
Filed Jan. 7, 1960, Ser. No. 1,041
15 Claims. (Cl. 259—4)

This invention relates to an improved apparatus for producing a dressing such as salad dressing, mayonnaise dressing or the like, and the invention of this application is an improvement over Epstein et al. Patent No. 1,949,791, granted March 6, 1934 and Joffee et al., Patent No. 2,776,119, granted January 1, 1957.

In the production of such dressings the usual required ingredients are assembled and premixed in a container, commonly referred to as a premixer, the ingredients for mayonnaise dressing usually consisting of eggs, oil, vinegar and seasoning in desired proportions. In the case of salad dressing a starch base is suitably cooked in a cooker, then transferred to a cooler for cooling the same and then transferred into a premixer along with desired proportions of eggs, oil, vinegar and seasoning where the ingredients are premixed and blended. The resulting mixture of the required ingredients is then transferred from the premixer through a mixture conduit at a substantially constant rate in a flowing stream to an emulsifying apparatus such as a colloid mill or the like. An inert gas such as nitrogen or carbon dioxide or the like is introduced into the mixture in the flowing stream path in the mixture conduit, whereby the combined mixture and gas are treated in the emulsifier apparatus to complete the emulsion. The emulsion is then transferred to a container or hopper of a jar filling machine or the like. Preferably the foregoing process is carried on in a continuous or semi-continuous manner for maximum production purposes. The introduction of the inert gas into the mixture results in the production of a very fine dressing having desirable physical characteristics and texture, having no separation and hence long shelf life, and having long keeping qualities.

If too little inert gas is introduced into the flowing stream of dressing, its characteristics are unfavorably altered and the keeping qualities are diminished, and if too much inert gas is introduced therein, its characteristics are also unfavorably altered and the product will settle. If the introduction of the inert gas is not uniform in the continuous or semi-continuous process, the characteristics of the end product will not be uniform.

The principal object of this invention is to provide an improved apparatus for producing such dressings and more particularly for introducing the inert gas into the flowing stream of dressing mixture in an improved manner, wherein correct amounts of inert gas are at all times uniformly introduced, wherein the end product is at all times uniform, and wherein the end product has most favorable characteristics, long keeping qualities and emulsion stability.

In accordance with this invention, a gas conduit connects the source of inert gas to the dressing mixture conduit between the pump and the emulsifying apparatus for introducing the inert gas into the flowing stream of the dressing mixture whereby the combined mixture and gas are treated in the emulsifying apparatus to complete the emulsion. An orifice is located in the gas conduit for controlling the rate of flow of the inert gas therethrough. A regulating valve is also located in the gas conduit between the orifice and the source of inert gas, and it is provided with control means responsive to the pressure of the inert gas on the outlet side of the regulating valve and responsive to the pressure of the dressing mixture on the discharge side of the pump for automatically adjusting the regulating valve to maintain a desired pressure differential between the pressure of the inert gas and the pressure of the dressing mixture. As a result, the inert gas is automatically introduced at a substantially constant rate of flow into the flowing stream of the dressing mixture which is also flowing at a substantially constant rate, thereby assuring the introduction of the proper amount of inert gas into the dressing mixture even though the pressure of the flowing stream of dressing mixture may vary due to different dressing products being processed, specific gravity thereof and the like.

Also, in accordance with this invention, the orifice and the regulating valve may also be manually adjusted to obtain desired rates of flow of the inert gas and desired differential pressures in setting up the apparatus which are thereafter automatically maintained for accurate and dependable operation. Preferably, a flow meter and a pressure meter are connected into the gas conduit for indicating the rate of flow and the pressure of the inert gas to facilitate setting up of the apparatus and checking its operation. A control system is also preferably provided for sequentially starting operation of the pump, starting operation of the emulsifying apparatus and opening a solenoid shut off valve in the gas conduit in starting the apparatus into operation, and for controlling signal lights for indicating the operating condition of the apparatus.

Further objects of this invention reside in the details of construction of the apparatus for producing dressing and in the coperative relationships between the component parts thereof.

Other objects and advantages of this invention will become apparent to those skilled in the art upon reference to the accompanying specification, claims and drawings in which:

FIG. 1 is an illustration of an apparatus for producing salad dressing or the like in accordance with this invention;

FIG. 2 is a wiring diagram of the control means illustrated in FIG. 1;

Figure 3:
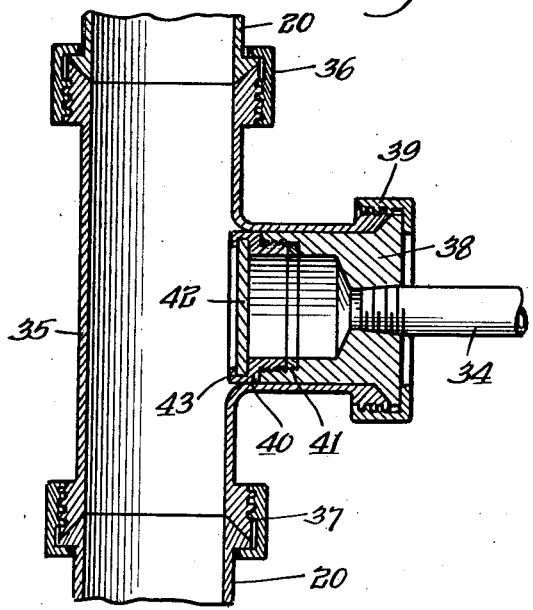
FIG. 3 is an enlarged sectional view of a fitting for introducing inert gas into the salad dressing mixture.

An apparatus for producing dressing such as salad dressing, mayonnaise or the like in accordance with this invention is illustrated in FIG. 1. A pair of premixers 10 and 11 having suitable power driven agitating means 12 and 13 are provided for premixing and blending the dressing ingredients. The ingredients for mayonnaise dressing, usually consisting of eggs, oil, vinegar and seasoning in desired proportions, are placed in the premixers 10 and 11 and, if a salad dressing is to be produced, a suitable starch base is placed in the premixers 10 and 11 along with desired proportions of eggs, oil, vinegar and seasoning and are premixed and blended therein. The starch base, after being cooked and cooled, may be introduced into the premixers 10 and 11 through conduits 14, 16 or 14, 17 depending upon the position of a 3-way valve 15. Two sets of premixers are preferably utilized so that the apparatus will produce the dressing in a substantially continuous manner. The dressing ingredients may be placed in, premixed and blended, for example, in the premixer 10 while a dressing mixture is being withdrawn from the premixer 11 and vice versa.

The dressing mixture is withdrawn from the premixer 10 or the premixer 11 under the control of valves 18 and 19 through a mixture conduit 20. Connected into the mixture conduit 20 is a pump 21 driven by an electric motor 22 for forcing the dressing mixture in a flowing stream under pressure into a mill 23 of an emulsifying apparatus driven by a motor 24. The emulsified dressing product is discharged from the mill 23 through a conduit 25 into a container or hopper 26 of a jar filling machine or the like.

The inert gas, such as nitrogen, carbon dioxide or the like, may be supplied from suitable gas bottles 30 having a pressure regulating device 31 provided with gauges 32 and 33 for indicating the gas pressure within the bottles 30 and the gas pressure being delivered by the regulator 31. The inert gas is conducted by a gas conduit 34 to a fitting 35 connected in the dressing mixture conduit 20 on the discharge side of the pump 21.

The fitting 35 for introducing the inert gas into the dressing mixture is illustrated in more detail in FIG. 3. It includes a standard sanitary T-fitting having through legs provided with connections 36 and 37 for connecting the same into the dressing mixture conduit 20. The other leg of the T-fitting receives a plug member 38 held in place therein by a suitable connector 39. The plug member 38 has a submember 40 secured therein and sealed by an O-ring 41. The submember 40 carries a perforate or porous member 42 suitably held in place as indicated at 43. The inert gas supplied by the gas conduit 34 permeates through the perforate or porous member 42 and, since that member 42 is contacted by the flowing stream of the dressing mixture, the inert gas is uniformly and evenly dispersed in the dressing mixture. The parts of the fitting 35 may be readily disassembled for cleaning purposes.

Referring again to FIG. 1, a check valve 45 is included in the gas conduit 20 to prevent backup of any dressing mixture from the fitting 35 to the gas conduit 34, should there be a malfunctioning of the apparatus tending so to do. Also located in the gas conduit 34 is an orifice 46 which is manually adjustable and which may take the form of a manually adjustable needle valve. The function of the orifice 46 is to regulate the rate of flow of the inert gas in the gas conduit 34. A flow meter 47 is also connected into the gas conduit 34 for indicating the rate of flow of the inert gas therein. A pressure meter 48 is connected to the gas conduit 34 and indicates the pressure therein. A pressure controller 49 having a pressure operated switch 50 is also connected to the gas conduit 34 and, when the pressure in the gas conduit 34 rises to a predetermined value, the pressure switch 50 is closed. The pressure at which the switch 50 closes may be adjusted as desired. Also located in the gas conduit 34 is a shut-off valve 51 which is opened by a solenoid 52 when the latter is energized, the purpose of the valve 51 being to shut off the supply of the inert gas when the apparatus is shut down.

Figure 4:
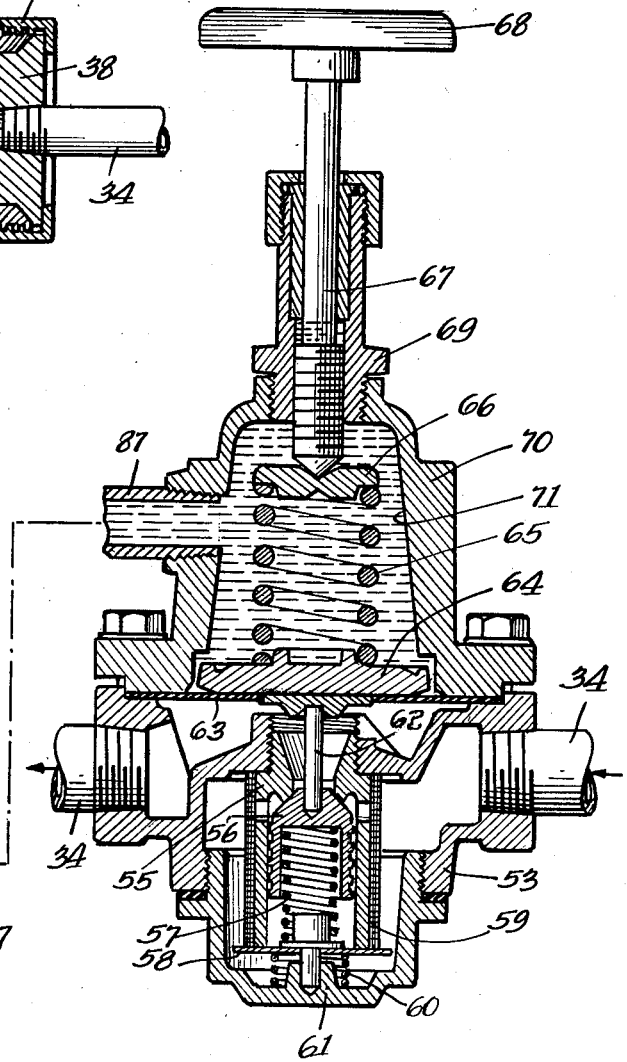
FIG. 4 is a sectional view through the regulating valve and illustrating the control means therefor.

A regulating valve 53 is also connected into the gas conduit 34, and the construction of this regulating valve is illustrated in FIG. 4. The regulating valve 53 includes a seat member 55 and a valve member 56 cooperating therewith for regulating the flow of the inert gas through the regulating valve in the direction indicated by the arrows. A spring 57 interposed between the valve member 56 and a plate 58 operates to close the valve member 56 against the seat member 55, the plate 58 holding a screen 59 in place and being held in place itself by a spring 60. A cap 61 suitably secured in place holds the aforementioned parts in their proper positions. A stem 62 extends from the valve member 56 up through the seat member 55 into engagement with a diaphragm 63 suitably secured in place in the regulating valve. A plate 64 which engages the diaphragm 63 is pressed downwardly by a spring 65 engaging a follower 66 which in turn is engaged by a stem 67 screw threadedly mounted in a bonnet 69 carried by a housing 70 suitably secured in place. The stem 67 may be rotated by a suitable handle 68 for adjusting the compression of the spring 65. The housing 70 forms a hermetically sealed chamber 71 above the diaphragm 63, this chamber being suitably sealed by packing around the stem 67. The spring 65 normally urges the valve member 56 away from the seat member 55 and the diaphragm 63 is subject to the pressure on the outlet side of the regulating valve. The pressure of the inert gas on the outlet side of the regulating valve acts upon the diaphragm 63 against the action of the spring 65 to move the valve member 56 toward the seat member 55. Thus, by reason of the diaphragm 63 and the spring 65, the regulating valve operates to maintain the inert gas on the outlet side of the regulating valve at a substantially constant pressure determined by the force of the spring 65 which in turn may be manually adjusted by manipulating the handle 68.

Figure 5:
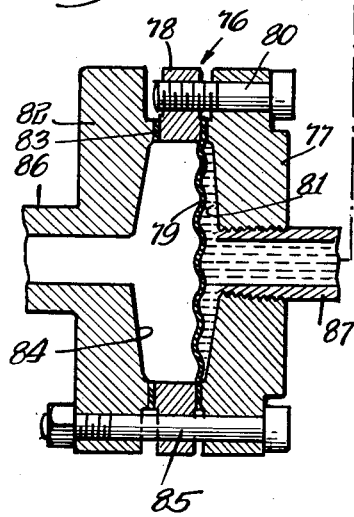
FIG. 5 is a sectional view of a control diaphragm arrangement for transmitting pressure conditions in the dressing mixture to the control means of the regulating valve.

Referring again to FIG. 1, a T-fitting 75 is also connected in the dressing mixture conduit 20 on the discharge side of the pump 21, and this fitting 75 communicates with a diaphragm assembly 76 which is shown more clearly in FIG. 5. The diaphragm assembly 76 includes a first part 77 which is connected by screws 80 to a second part 78, a diaphragm 78 being interposed between the two parts and being hermetically sealed therebetween. A chamber 81 is formed in the first part 77 behind the diaphragm 79. A third part 82 is secured to the first and second parts 77 and 78 by bolts 85, the joint between the second and third parts 78 and 82 being sealed by a suitable gasket 83. The second and third parts 78 and 82 form a chamber 84 adjacent to diaphragm 79 which connects through an extension 86 to the fitting 75. A pressure corresponding to the pressure of the dressing mixture on the discharge side of the pump 21 is, therefore, produced in the chamber 84 which operates to flex the diaphragm 79. The chamber 81 on the other side of the diaphragm 79 communicates through a capillary tube 87 with the chamber 71 in the regulating valve 53. The chamber 81, the capillary tube 87 and the chamber 71 are completely filled with a liquid.

As the pressure of the dressing mixture in the mixture conduit 20 increases and decreases, the pressure in the chamber 84 correspondingly increases and decreases to flex correspondingly the diaphragm 79. This flexing of the diaphragm 79 is transmitted through the liquid from the chamber 81 through the capillary tube 87 to the chamber 71 to correspondingly increase and decrease the pressure on the upper side of the diaphragm 63 of the regulating valve. An increase in pressure in the chamber 71 aids the spring 65 in moving the valve 56 away from the seat member 55, and a decrease in pressure subtracts the force on the diaphragm 63 to allow movement of the valve member 56 toward the seat member 55. Thus, the regulating valve 53 is operated to maintain a constant differential pressure between the pressure of the inert gas on the outlet side of the regulating valve 53 and the pressure of the dressing mixture in the mixture conduit 20 on the discharge side of the pump 21. The amount of this differential pressure may be manually adjusted by manipulating the handle 68 on the stem 67. By reason of the orifice 46 in the gas conduit 34 and the differential pressure control of the regulating valve 53, the rate of flow of the inert gas into the flowing stream of the dressing mixture in the dressing mixture conduit 20 may be maintained substantially constant, regardless of changes in pressure in the dressing mixture due to the type of dressing being processed, the specific gravity thereof or the like. Since the rate of flow of the dressing mixture in the mixture conduit 20 is substantially constant and since the rate of flow of the inert gas is substantially constant, the introduction of exact amounts of inert gas into the dressing mixture is at all times assured. By manually adjusting the orifice 46 and the regulating valve 53, desired selected rates of flow of the inert gas may be set up and may thereafter be automatically maintained. The pressure of the inert gas at the T-fitting 35 is greater than the pressure of the flowing stream of the dressing mixture to assure introduction of the inert gas into the dressing mixture.

The operation of the apparatus may be controlled from a suitable control panel 127 which is supplied with electrical power by means of line wires 125 and 126. The motor 22 of the pump 21, the motor 24 of the emulsifying apparatus, the solenoid 52 of the solenoid shut-off valve 51 and the pressure operated switch 50 of the pressure controller 49 are suitably electrically connected to the panel 127. Arranged on the panel 127 are a lock-in relay 95, a time delay relay 105, red and green indicating lights 90 and 91, start and stop switches 93 and 94 and selector switches 112, 117. The interconnection between these various electrical control elements is shown more clearly in FIG. 2.

In FIG. 2 like reference characters have been utilized for the motor 22 for driving the pump 21, the motor 24 for driving the emulsifier 23, the solenoid 52 of the solenoid shut-off valve 51, the switch 50 of the pressure controller 49, the red and green lights 90 and 91, the start and stop switches 93 and 94, the lock-in relay 95, the time delay relay 105 and the selector switches 112, 117. There is also shown a light 92 for illuminating the flow meter 47. The lock-in relay 95 includes an operating coil 96 which, when energized, moves switch arms 97 and 98 into engagement with contacts 99 and 101 and moves the switch arm 98 out of engagement with contact 100. The time delay relay 105 includes a timer motor 106 which, when energized, operates after a first time interval to move a switch arm 109 into engagement with a contact 110 and, after a second time interval, to move a switch arm 107 into engagement with a contact 108. The selector switch 112 connects contacts 113 and 114 when the switch is in the position shown and, when moved to the opposite position, connects contacts 115 and 116. Likewise, the selector switch 117 connects contacts 118 and 119 when the switch is in the position shown and connects contacts 120 and 121 when it is moved to the opposite position. The motors 22 and 24 are connected to suitable terminals and, likewise, the line wires 125 and 126 are connected to suitable terminals.

When the selector switches 112, 117 are in the position shown in FIG. 2, the apparatus as a whole is shut down, but the illuminating light 92 for the flow meter is energized through a circuit extending from the line wire 125 through contacts 116 and 114, selector switch 112, contact 113, normally closed stop switch 94 and illuminating lamp 92 back to the other line wire 126. At this same time, the red light 90 is illuminated to show that the system is shut down, the circuit therefor extending from the line wire 125 through contacts 114 and 116, selector switch 112, contact 113, stop switch 94, switch arm 98 and contact 100 of the lock-in relay, and the red light 90 back to the other line wire 126.

To start the system into operation, the normally open start switch 93 is momentarily closed to complete a starting circuit for the relay coil 96 of the lock-in relay 95, this circuit extending from the line wire 125 into contacts 116 and 114, selector switch 112, contact 113, the start switch 93 and relay coil 96 back to the other line wire 126. As a result, the relay coil 96 is energized to move the switch arm 98 out of engagement with the contact 100 to interrupt the circuit to the red light for extinguishing the same, and the switch arms 97 and 98 are moved into engagement with contacts 99 and 101. Movement of the switch arm 97 into engagement with the contact 99 completes a locking or holding circuit for the relay coil 96 which may be traced from the line wire 125 through contacts 116 and 114, selector switch 112, contact 113, normally closed stop switch 94, switch arm 97, contact 99 and relay coil 96 back to the other line wire 126. Thus, the relay coil 96 is maintained energized through the normally closed stop switch 94 independently from the normally open start switch 93. Movement of the switch arm 98 into engagement with the contact 101 completes several circuits extending in common from the line wire 125 through contacts 116 and 114, selector switch 112, contact 113, normally closed stop switch 94, switch arm 98 and contact 101. From the contact 101 a circuit is completed through the timer motor 106 back to the line wire 126 for energizing the same. Movement of the switch arm 98 also completes a second circuit from the contact 101 through contact 118, selector switch 117, contacts 119 and 121 and the electric motor 22 back to the line wire 126 for starting operation of the motor 22 to drive the pump 21. Following a time interval, the timer motor 106 operates to move the switch arm 109 into engagement with the contact 110 so as to complete a circuit from the contact 101 of the lock-in relay 95 through switch arm 109, contact 110 and motor 24 back to the other line wire 126. Completion of this circuit energizes the motor 24 for starting operation of the emulsifying apparatus 23. Following a further time interval, the switch arm 107 is moved into engagement with the contact 108 for completing a circuit from the line wire 125 through contacts 116 and 114, selector switch 112, contact 113, switch arm 107, contact 108 and solenoid 52 of the solenoid shut off valve 51 back to the other line wire 126. The solenoid valve is thus opened following this further time interval to supply inert gas through the gas conduit 34 to the dressing mixture in the mixture conduit 20 in the manner pointed out above. When the inert gas is so supplied at the proper pressure, the switch 50 of the pressure controller 49 is closed to complete a further circuit from the contact 101 of the lock-in relay through the pressure operated switch 50 and the green light 91 back to the other line wire 126 for alluminating the green light to indicate that the system is in complete and satisfactory operation. If the pressure of the inert gas should decrease below the desired low limit, the pressure operated switch 50 is opened to extinguish the green light which indicates to the operator that the system is not functioning properly.

In order to stop operation of the system, the stop button 94 is opened. The relay coil 96 of the holding or lock-in relay 95 is de-energized to move the switch arm 97 out of engagement with the contact 99, to move the switch arm 98 out of engagement with the contact 101 and to move the switch arm 98 into engagement with the contact 100. Since the switch arm 97 is moved out of engagement with the contact 99, the lock-in relay cannot again be energized until such time as the normally open start button is closed. Movement of the switch arm 98 into engagement with the contact 100 completes the above described circuit to the red light for illuminating the same to indicate that the system is shut down. Movement of the switch arm 98 out of engagement with the contact 101 breaks the circuit to the green light 91 also to indicate that the system is shut down. Movement of the switch arm 98 out of engagement with the contact 101 breaks the circuit to the motor 22 of the pump 21 to stop operation of the pump 21, breaks the circuit to the motor 24 of the emulsifying apparatus 23 to stop operation thereof and breaks the circuit to the timer motor 106 to de-energize the same. When this occurs, the switch arms 107 and 109 are immediately moved out of engagement with the contacts 108 and 110 and movement of the switch arm 107 out of engagement with the contact 108 immediately de-energizes the solenoid 52 to close the solenoid shut-off valve 51 and stop the flow of the inert gas. The entire system is thus shut down by opening the stop button 94 and the shut-down condition of the system is indicated by the red light being illuminated and the green light extinguished.

When the selector switch 117 is moved into engagement with the contacts 120 and 121, the circuit is completed from the line wire 125 through contact 120, selector switch 117, contact 121 and motor 22 back to the other line wire 126 to cause operation thereof and, hence, operation of the pump 21. When the selector switch 112 is moved into engagement with the contacts 115 and 116, a circuit is completed from the line wire 125 through contact 116, selector switch 112, contact 115 and timer motor 106 of the time delay relay 105 back to the other line wire 126. Energization of the timer motor 106 following a time interval moves switch arm 109 into engagement with contact 110 to complete a circuit from the line wire 125 through contact 116, selector switch 112, contact 115, switch arm 109, contact 110 and motor 24 back to the line wire 126 for operating the same and, hence, the emulsifying apparatus 23. In this way, the pump 21 and the emulsifying apparatus 23 may be sequentially placed in operation by means of the manipulating of the selector switches 117 and 112. Movement of the switch arm 107 into engagement with the contact 108 at this time does not energize the solenoid 52, since the circuit through the solenoid 52 is broken at contact 113 of the selector switch 112.

While, for purposes of illustration, one form of this invention has been disclosed, other forms thereof may become apparent to those skilled in the art upon reference to this disclosure and, therefore, this invention is to be limited only by the scope of the appended claims.

We claim as our invention:

1. In an apparatus for producing a dressing including a premixer in which the salad ingredients are assembled and premixed, an emulsifying apparatus, a mixture conduit extending between the premixer and the emulsifying apparatus, a pump means in the mixture conduit for pumping under pressure the dressing mixture in a flowing stream at a substantially constant rate substantially irrespective of the pressure thereof at the discharge side of the pump means from the premixer to the emulsifying apparatus, a source of inert gas under pressure, and means including a gas conduit connecting the source of inert gas to the mixture conduit for introducing the inert gas into the flowing stream of the dressing mixture whereby the combined mixture and gas are treated in the emulsifying apparatus to complete the emulsion, the improvement comprising, said gas conduit being connected to the mixture conduit between the pump means and the emulsifying apparatus, a flow restricting orifice in the gas conduit for restricting and controlling the rate of flow of inert gas therethrough in accordance with the differential in pressure thereacross, a regulating valve in the gas conduit between the flow restricting orifice and the source of inert gas, and control means for the regulating valve responsive to the pressure of the inert gas on the outlet side of the regulating valve and responsive to the pressure of the dressing mixture on the discharge side of the pump means for automatically adjusting the regulating valve to maintain a desired pressure differential across the flow restricting orifice for maintaining a substantially constant rate of flow of the inert gas through the flow restricting orifice into the flowing stream of the dressing mixture.

2. In an apparatus for producing a dressing including a premixer in which the salad ingredients are assembled and premixed, an emulsifying apparatus, a mixture conduit extending between the premixer and the emulsifying apparatus, a pump means in the mixture conduit for pumping under pressure the dressing mixture in a flowing stream at a substantially constant rate substantially irrespective of the pressure thereof at the discharge side of the pump means from the premixer to the emulsifying apparatus, a source of inert gas under pressure, and means including a gas conduit connecting the source of inert gas to the mixture conduit for introducing the inert gas into the flowing stream of the dressing mixture whereby the combined mixture and gas are treated in the emulsifying apparatus to complete the emulsion, the improvement comprising, said gas conduit being connected to the mixture conduit between the pump means and the emulsifying apparatus, a flow restricting orifice in the gas conduit for restricting and controlling the rate of flow of inert gas therethrough in accordance with the differential in pressure thereacross, a regulating valve in the gas conduit between the flow restricting orifice and the source of inert gas, and control means for the regulating valve responsive to the pressure of the inert gas on the outlet side of the regulating valve and responsive to the pressure of the dressing mixture on the discharge side of the pump means for automatically adjusting the regulating valve to maintain a desired pressure differential across the flow restricting orifice for maintaining a substantially constant rate of flow of the inert gas through the flow restricting orifice into the flowing stream of the dressing mixture, manually operated control means for manually adjusting the flow restricting orifice in the gas conduit, and manually operated control means for the regulating valve for manually adjusting the pressure differential being maintained across the flow restricting orifice.

3. In an apparatus for producing a dressing including a premixer in which the salad ingredients are assembled and premixed, an emulsifying apparatus, a mixture conduit extending between the premixer and the emulsifying apparatus, a pump means in the mixture conduit for pumping under pressure the dressing mixture in a flowing stream at a substantially constant rate substantially irrespective of the pressure thereof at the discharge side of the pump means from the premixer to the emulsifying apparatus, a source of inert gas under pressure, and means including a gas conduit connecting the source of inert gas to the mixture conduit for introducing the inert gas into the flowing stream of the dressing mixture whereby the combined mixture and gas are treated in the emulsifying apparatus to complete the emulsion, the improvement comprising, said gas conduit being connected to the mixture conduit between the pump means and the emulsifying apparatus, a flow restricting orifice in the gas conduit for restricting and controlling the rate of flow of inert gas therethrough in accordance with the differential in pressure thereacross, a regulating valve in the gas conduit between the flow restricting orifice and the source of inert gas, and control means for the regulating valve responsive to the pressure of the inert gas on the outlet side of the regulating valve and responsive to the pressure of the dressing mixture on the discharge side of the pump means for automatically adjusting the regulating valve to maintain a desired pressure differential across the flow restricting orifice for maintaining a substantially constant rate of flow of the inert gas through the flow restricting orifice into the flowing stream of the dressing mixture, a flow meter connected in the gas conduit between the flow restricting orifice and the regulating valve for indicating the rate of flow of the inert gas, a pressure meter connected in the gas conduit between the flow restricting orifice and the regulating valve for indicating the pressure of the inert gas, manually operated control means for manually adjusting the flow restricting orifice in the gas conduit, and manually operated control means for the regulating valve for manually adjusting the pressure differential being maintained across the flow restricting orifice.

4. In an apparatus for producing a dressing including a premixer in which the salad ingredients are assembled and premixed, an emulsifying apparatus, a mixture conduit extending between the premixer and the emulsifying apparatus, a pump means in the mixture conduit for pumping under pressure the dressing mixture in a flowing stream at a substantially constant rate substantially irrespective of the pressure thereof at the discharge side of the pump means from the premixer to the emulsifying apparatus, a source of inert gas under pressure, and means including a gas conduit connecting the source of inert gas to the mixture conduit for introducing the inert gas into the flowing stream of the dressing mixture whereby the combined mixture and gas are treated in the emulsifying apparatus to complete the emulsion, the improvement comprising, said gas conduit being connected to the mixture conduit between the pump means and the emulsifying apparatus, a solenoid valve in the gas conduit normally closing the same, control means for sequentially starting the pump means, starting the emulsifying apparatus, and opening the solenoid valve, a flow restricting orifice in the gas conduit for restricting and controlling the rate of flow of inert gas therethrough in accordance with the differential in pressure thereacross, a regulating valve in the gas conduit between the flow restricting orifice and the source of inert gas, and control means for the regulating valve responsive to the pressure of the inert gas on the outlet side of the regulating valve and responsive to the pressure of the dressing mixture on the discharge side of the pump means for automatically adjusting the regulating valve to maintain a desired pressure differential across the flow restricting orifice for maintaining a substantially constant rate of flow of the inert gas through the flow restricting orifice into the flowing stream of the dressing mixture.

5. In an apparatus for producing adressing including a premixer in which the salad ingredients are assembled and premixed, an emulsifying apparatus, a mixture conduit extending between the premixer and the emulsifying apparatus, a pump means in the mixture conduit for pumping the dressing mixture in a flowing stream at a substantially constant rate from the premixer to the emulsifying apparatus under pressure, a source of inert gas under pressure, and means including a gas conduit connecting the source of inert gas to the mixture conduit for introducing the inert gas into the flowing stream of the dressing mixture whereby the combined mixture and gas are treated in the emulsifying apparatus to complete the emulsion, the improvement comprising, said gas conduit being connected to the mixture conduit between the pump means and the emulsifying apparatus, a solenoid valve in the gas conduit normally closing the same, a red indicating light which is illuminated when the apparatus is shut down, a green indicating light which is illuminated when the apparatus is operating, control means for sequentially starting the pump means and extinguishing the red indicating light, starting the emulsifier apparatus, and opening the solenoid valve, control means responsive to the pressure of the inert gas at the outlet of the solenoid valve for illuminating the green light when the solenoid valve is opened, a regulating valve in the gas conduit for regulating the flow of inert gas therethrough, and control means for the regulating valve responsive to the pressure of the inert gas on the outlet side of the regulating valve and responsive to the pressure of the dressing mixture on the discharge side of the pump means for automatically adjusting the regulating valve to maintain a desired pressure differential between the pressure of the inert gas and the pressure of the dressing mixture.

6. In an apparatus for producing a dressing including a premixer in which the salad ingredients are assembled and premixed, an emulsifying apparatus, a mixture conduit extending between the premixer and the emulsifying apparatus, a pump means in the mixture conduit for pumping under pressure the dressing mixture in a flowing stream at a substantially constant rate substantially irrespective of the pressure thereof at the discharge side of the pump means from the premixer to the emulsifying apparatus, a source of inert gas under pressure, and means including a gas conduit connecting the source of inert gas to the mixture conduit for introducing the inert gas into the flowing stream of the dressing mixture whereby the combined mixture and gas are treated in the emulsifying apparatus to complete the emulsion, the improvement comprising, said gas conduit being connected to the mixture conduit between the pump means and the emulsifying apparatus, a solenoid valve in the gas conduit normally closing the same, a red indicating light which is illuminated when the apparatus is shut down, a green indicating light which is illuminated when the apparatus is operating, control means for sequentially starting the pump means and extinguishing the red indicating light, starting the emulsifier apparatus, and opening the solenoid valve, control means responsive to the pressure of the inert gas at the outlet of the solenoid valve for illuminating the green light when the solenoid valve is opened, a flow restricting orifice in the gas conduit for restricting and controlling the rate of flow of inert gas therethrough in accordance with the differential in pressure thereacross, a regulating valve in the gas conduit between the flow restricting orifice and the source of inert gas, and control means for the regulating valve responsive to the pressure of the inert gas on the outlet side of the regulating valve and responsive to the pressure of the dressing mixture on the discharge side of the pump means for automatically adjusting the regulating valve to maintain a desired pressure differential across the flow restricting orifice for maintaining a substantially constant rate of flow of the inert gas into the flowing stream of the dressing mixture.

7. In an apparatus for producing a dressing including a premixer in which the salad ingredients are assembled and premixed, an emulsifying apparatus, a mixture conduit extending between the premixer and the emulsifying apparatus, a pump means in the mixture conduit for pumping the dressing mixture in a flowing stream at a substantially constant rate from the premixer to the emulsifying apparatus under pressure, a source of inert gas under pressure, and means including a gas conduit connecting the source of inert gas to the mixture conduit for introducing the inert gas into the flowing stream of the dressing mixture whereby the combined mixture and gas are treated in the emulsifying apparatus to complete the emulsion, the improvement comprising, said gas conduit being connected to the mixture conduit between the pump means and the emulsifying apparatus, a solenoid valve on the gas conduit normally closing the same, a red indicating light which is illuminated when the apparatus is shut down, a green indicating light which is illuminated when the apparatus is operating, control means for sequentially starting the pump means and extinguishing the red indicating light, starting the emulsifier apparatus, and opening the solenoid valve, control means responsive to the pressure of the inert gas at the outlet of the solenoid valve for illuminating the green light when the solenoid valve is opened, a regulating valve in the gas conduit for regulating the flow of inert gas therethrough, and control means for the regulating valve responsive to the pressure of the inert gas on the outlet side of the regulating valve and responsive to the pressure of the dressing mixture on the discharge side of the pump means for automatically adjusting the regulating valve to maintain a desired pressure differential between the pressure of the inert gas and the pressure of the dressing mixture, and manually operated control means for the regulating valve for manually adjusting the pressure differential being maintained.

8. In an apparatus for producing a dressing including a premixer in which the salad ingredients are assembled and premixed, an emulsifying apparatus, a mixture conduit extending between the premixer and the emulsifying apparatus, a pump means in the mixture conduit for pumping under pressure the dressing mixture in a flowing stream at a substatnially constant rate substantially irrespective of the pressure thereof at the discharge side of the pump means from the premixer to the emulsifying apparatus, a source of inert gas under pressure, and means including a gas conduit connecting the source of inert gas to the mixture conduit for introducing the inert gas into the flowing stream of the dressing mixture whereby the combined mixture and gas are treated in the emulsifying apparatus to complete the emulsion, the improvement comprising, said gas conduit being connected to the mixture conduit between the pump means and the emulsifying apparatus, a solenoid valve in the gas conduit normally closing the same, control means for sequentially starting the pump means, starting the emulsifying apparatus, and opening a solenoid valve, a flow restricting orifice in the gas conduit for restricting and controlling the rate of flow of inert gas therethrough in accordance with the differential in pressure thereacross, a regulating valve in the gas conduit between the flow restricting orifice and the source of inert gas, and control means for the regulating valve responsive to the pressure of the inert gas on the outlet side of the regulating valve and responsive to the pressure of the dressing mixture on the discharge side of the pump means for automatically adjusting the regulating valve to maintain a desired pressure differential across the flow restricting orifice for maintaining a substantially constant rate of flow of the inert gas through the flow restricting orifice into the flowing stream of the dressing mixture, manually operated control means for manually adjusting the flow restricting orifice in the gas conduit, and manually operated control means for the regulating valve for manually adjusting the presure differential being maintained across the flow restricting orifice.

9. In an apparatus for producing a dressing including a premixer in which the salad ingredients are assembled and premixed, an emulsifying apparatus, a mixture conduit extending between the premixer and the emulsifying apparatus, a pump means in the mixture conduit for pumping under pressure the dressing mixture in a flowing stream at a substantially constant rate substantially irrespective of the pressure thereof at the dischare side of the pump means from the premixer to the emulsifying apparatus, a source of inert gas under pressure, and means including a gas conduit connecting the source of inert gas to the mixture conduit for introducing the inert gas into the flowing stream of the dressing mixture whereby the combined mixture and gas are treated in the emulsifying apparatus to complete the emulsion, the improvement comprising, said gas conduit being connected to the mixture conduit between the pump means and the emulsifying apparatus, a solenoid valve in the gas conduit normally closing the same, a red indicating light which is illuminated when the apparatus is shut down, a green indicating light which is illuminated when the apparatus is operating, control means for sequentially starting the pump means and extinguishing the red indicating light, starting the emulsifier apparatus, and opening the solenoid valve, control means responsive to the pressure of the inert gas at the outlet of the solenoid valve for illuminating the green light when the solenoid valve is opened, a flow restricting orifice in the gas conduit for restricting and controlling the rate of flow of inert gas therethrough in accordance with the differential in pressure thereacross, a regulating valve in the gas conduit between the flow restricting orifice and the source of inert gas, and control means for the regulating valve responsive to the pressure of the inert gas on the outlet side of the regulating valve and responsive to the pressure of the dressing mixture on the discharge side of the pump means for automatically adjusting the regulating valve to maintain a desired pressure differential across the flow restricting orifice for maintaining a substantially constant rate of flow of the inert gas through the flow restricting orifice into the flowing stream of the dressing mixture, manually operated control means for manually adjusting the flow restricting orifice in the gas conduit, and manually operated control means for the regulating valve for manually adjusting the pressure differential being maintained across the flow restricting orifice.

10. In an apparatus for producing a dressing including a premixer in which the salad ingredients are assembled and premixed, an emulsifying apparatus, a mixture conduit extending between the premixer and the emulsifying apparatus, a pump means in the mixture conduit for pumping under pressure the dressing mixture in a flowing stream at a substantially constant rate substantially irrespective of the pressure thereof at the discharge side of the pump means from the premixer to the emulsifying apparatus, a source of inert gas under pressure, and means including a gas conduit connecting the source of inert gas to the mixture conduit for introducing the inert gas into the flowing stream of the dressing mixture whereby the combined mixture and gas are treated in the emulsifying apparatus to complete the emulsion, the improvement comprising, said gas conduit being connected to the mixture conduit between the pump means and the emulsifying apparatus, a solenoid valve in the gas conduit normally closing the same, control means for sequentially starting the pump means, starting the emulsifying apparatus, and opening the solenoid valve, a flow restricting orifice in the gas conduit for restricting and controlling the rate of flow of inert gas therethrough in accordance with the differential in pressure thereacross, a regulating valve in the gas conduit between the flow restricting orifice and the source of inert gas, and control means for the regulating valve responsive to the pressure of the inert gas on the outlet side of the regulating valve and responsive to the pressure of the dressing mixture on the discharge side of the pump means for automatically adjusting the regulating valve to maintain a desired pressure differential across the flow restricting orifice for maintaining a substantially constant rate of flow of the inert gas through the flow restricting orifice into the flowing stream of the dressing mixture, a flow meter connected in the gas conduit between the flow restricting orifice and the regulating valve for indicating the rate of flow of the inert gas, a pressure meter connected in the gas conduit between the flow restricting orifice and the regulating valve for indicating the pressure of the inert gas, manually operated control means for manually adjusting the flow restricting orifice in the gas conduit, and manually operated control means for the regulating valve for manually adjusting the pressure differential being maintained across the flow restricting orifice.

11. In an apparatus for producing a dressing including a premixer in which the salad ingredients are assembled and premixed, an emulsifying apparatus, a mixture conduit extending between the premixer and the emulsifying apparatus, a pump means in the mixture conduit for pumping under pressure the dressing mixture in a flowing stream at a substantially constant rate substantially irrespective of the pressure thereof at the discharge side of the pump means from the premixer to the emulsifying apparatus, a source of inert gas under pressure, and means including a gas conduit connecting the source of inert gas to the mixture conduit for introducing the inert gas into the flowing stream of the dressing mixture whereby the combined mixture and gas are treated in the emulsifying apparatus to complete the emulsion, the improvement comprising, said gas conduit being connected to the mixture conduit between the pump means and the emulsifying apparatus, a solenoid valve in the gas conduit normally closing the same, a red indicating light which is illuminated when the apparatus is shut down, a green indicating light which is illuminated when the apparatus is operating, control means for sequentially starting the pump means and extinguishing the red indicating light, starting the emulsifier apparatus, and opening the solenoid valve, control means responsive to the pressure of the inert gas at the outlet of the solenoid valve for illuminating the green light when the solenoid valve is opened, a flow restricting orifice in the gas conduit for restricting and controlling the rate of flow of inert gas therethrough in accordance with the differential in pressure thereacross, a regulating valve in the gas conduit between the flow restricting orifice and the source of inert gas, and control means for the regulating valve responsive to the pressure of the inert gas on the outlet side of the regulating valve and responsive to the pressure of the dressing mixture on the discharge side of the pump means for automatically adjusting the regulating valve to maintain a desired pressure differential across the flow restricting orifice for maintaining a substantially constant rate of flow of the inert gas through the flow restricting orifice into the flowing stream of the dressing mixture, a flow meter connected in the gas conduit between the flow restricting orifice and the regulating valve for indicating the rate of flow of the inert gas, a pressure meter connected in the gas conduit between the flow restricting orifice and the regulating valve for indicating the pressure of the inert gas, manually operated control means for manually adjusting the flow restricting orifice in the gas conduit, and manually operated control means for the regulating valve for manually adjusting the pressure differential being maintained across the flow restricting orifice.

12. In an apparatus for producing a dressing including a premixer in which the salad ingredients are assembled and premixed, an emulsifying apparatus, a mixture conduit extending between the premixer and the emulsifying apparatus, a pump means in the mixture conduit for pumping the dressing mixture in a flowing stream at a substantially constant rate from the premixer to the emulsifying apparatus under pressure, a source of inert gas under pressure, and means including a gas conduit connecting the source of inert gas to the mixture conduit for introducing the inert gas into the flowing stream of the dressing mixture whereby the combined mixture and gas are treated in the emulsifying apparatus to complete the emulsion, the improvement comprising, said gas conduit being connected to the mixture conduit between the pump means and the emulsifying apparatus, a regulating valve in the gas conduit for regulating the flow of inert gas therethrough and including a spring for normally opening the valve, a diaphragm communicating on one side with the outlet of the regulating valve for closing the valve in response to the output pressure of the regulating valve and a sealed chamber communicating with the other side of the diaphragm for opening the valve upon an increase in pressure therein, a control diaphragm communicating on one side with and responsive to the pressure of the dressing mixture at the discharge side of the pump means, and a sealed liquid fill system connected between the other side of the control diaphragm and the sealed chamber of the regulating valve for automatically adjusting the regulating valve to maintain a desired pressure differential between the pressure of the inert gas and the pressure of the dressing mixture.

13. In an apparatus for producing a dressing including a premixer in which the salad ingredients are assembled and premixed, an emulsifying apparatus, a mixture conduit extending between the premixer and the emulsifying apparatus, a pump means in the mixture conduit for pumping under pressure the dressing mixture in a flowing stream at a substantially constant rate substantially irrespective of the pressure thereof at the discharge side of the pump means from the premixer to the emulsifying apparatus, a source of inert gas under pressure, and means including a gas conduit connecting the source of inert gas under pressure, and means including a gas conduit connecting the source of inert gas to the mixture conduit for introducing the inert gas into the flowing stream of the dressing mixture whereby the combined mixture and gas are treated in the emulsifying apparatus to complete the emulsion, the improvement comprising, said gas conduit being connected to the mixture conduit between the pump means and the emulsifying apparatus, a flow restricting orifice in the gas conduit for restricting and controlling the rate of flow of inert gas therethrough in accordance with the differential in pressure thereacross, a regulating valve in the gas conduit between the flow restricting orifice and the source of inert gas and including a spring for normally opening the valve, a diaphragm communicating on one side with the outlet of the regulating valve for closing the valve in response to the output pressure of the regulating valve and a sealed chamber communicating with the other side of the diaphragm for opening the valve upon an increase in pressure therein, a control diaphragm communicating on one side with and responsive to the pressure of the dressing mixture at the discharge side of the pump means, and a sealed liquid fill system connected between the other side of the control diaphragm and the sealed chamber of the regulating valve for automatically adjusting the regulating valve to maintain a desired pressure differential across the flow restricting orifice for maintaining a substantially constant rate of flow of the inert gas through the flow restricting orifice into the flowing stream of the dressing mixture.

14. In an apparatus for producing a dressing including a premixer in which the salad ingredients are assembled and premixed, an emulsifying apparatus, a mixture conduit extending between the premixer and the emulsifying apparatus, a pump means in the mixture conduit for pumping the dressing mixture in a flowing stream at a substantially constant rate from the premixer to the emulsifying apparatus under pressure, a source of inert gas under pressure, and means including a gas conduit connecting the source of inert gas to the mixture conduit for introducing the inert gas into the flowing stream of the dressing mixture whereby the combined mixture and gas are treated in the emulsifying apparatus to complete the emulsion, the improvement comprising, said gas conduit being connected to the mixture conduit between the pump means and the emulsifying apparatus, a regulating valve in the gas conduit for regulating the flow of inert gas therethrough and including a spring for normally opening the valve, a diaphragm communicating on one side with the outlet of the regulating valve for closing the valve in response to the output pressure of the regulating valve and a sealed chamber communicating with the other side of the diaphragm for opening the valve upon an increase in pressure therein, a control diaphragm communicating on one side with and responsive to the pressure of the dressing mixture at the discharge side of the pump means, and a sealed liquid fill system connected between the other side of the control diaphragm and the sealed chamber of the regulating valve for automatically adjusting the regulating valve to maintain a desired pressure differential between the pressure of the inert gas and the pressure of the dressing mixture, and manually operated means for adjusting said spring for manually adjusting the pressure differential being maintained.

15. In an apparatus for producing a dressing including a premixer in which the salad ingredients are assembled and premixed, an emulsifying apparatus, a mixture conduit extending between the premixer and the emulsifying apparatus, a pump means in the mixture conduit for pumping under pressure the dressing mixture in a flowing stream at a substantially constant rate substantially irrespective of the pressure thereof at the discharge side of the pump means from the premixer to the emulsifying apparatus, a source of inert gas under pressure, and means including a gas conduit connecting the source of inert gas to the mixture conduit for introducing the inert gas into the flowing stream of the dressing mixture whereby the combined mixture and gas are treated in the emulsifying apparatus to complete the emulsion, the improvement comprising, said gas conduit being connected to the mixture conduit between the pump means and the emulsifying apparatus, a flow restricting orifice in the gas conduit for restricting and controlling the rate of flow of inert gas therethrough in accordance with the differential in pressure thereacross, a regulating valve in the gas conduit between the flow restricting orifice and the source of inert gas and including a spring for normally opening the valve, a diaphragm communicating on one side with the outlet of the regulating valve for closing the valve in response to the output pressure of the regulating valve and a sealed chamber communicating with the other side of the diaphragm for opening the valve upon an increase in pressure therein, a control diaphragm communicating on one side with and responsive to the pressure of the dressing mixture at the discharge side of the pump means, and a sealed liquid fill system connected between the other side of the control diaphragm and the sealed chamber of the regulating valve for automatically adjusting the regulating valve to maintain a desired pressure differential across the flow restricting orifice for maintaining a substantially constant rate of flow of the inert gas through the flow restricting orifice into the flowing stream of the dressing mixture, manually operated control means for manually adjusting the flow restricting orifice in the gas conduit, and manually operated means for the regulating valve for adjusting said spring for manually adjusting the pressure differential being maintained across the flow restricting orifice.

References Cited in the file of this patent

UNITED STATES PATENTS

| | | |
|---|---|---|
| 1,949,791 | Epstein et al. | Mar. 6, 1934 |
| 1,988,289 | Wittemann | Jan. 15, 1935 |
| 2,348,791 | Di Pietro | May 16, 1944 |
| 2,776,119 | Joffe et al. | Jan. 1, 1957 |
| 2,925,824 | Rockwell | Feb. 23, 1960 |